United States Patent [19]
Zaretsky

[11] Patent Number: 5,769,293
[45] Date of Patent: Jun. 23, 1998

[54] AUTOMOBILE TRUNK ORGANIZER

[76] Inventor: Boris Zaretsky, 5325 Mainstream Cir., Norcross, Ga. 30092

[21] Appl. No.: 548,040

[22] Filed: Oct. 25, 1995

[51] Int. Cl.$^6$ ...................................................... B60R 7/00
[52] U.S. Cl. .......................... 224/551; 224/539; 224/547; 224/560; 410/151
[58] Field of Search ................................... 224/543, 551, 224/542, 539, 560, 547; 296/37.8; 410/143, 151, 145, 149; 211/105.4, 105.5, 105.6

[56] References Cited

U.S. PATENT DOCUMENTS

| | | |
|---|---|---|
| D. 312,604 | 12/1990 | Barnes et al. . |
| 1,968,807 | 8/1934 | Bowers ................................ 211/105.6 |
| 3,110,506 | 11/1963 | O'Brien .............................. 211/105.6 |
| 3,880,394 | 4/1975 | Wisecarver ............................ 410/151 |
| 4,737,056 | 4/1988 | Hunt ....................................... 410/151 |
| 4,754,883 | 7/1988 | Grzywa . |
| 4,832,242 | 5/1989 | Leek . |
| 4,838,745 | 6/1989 | Haydock . |
| 5,025,964 | 6/1991 | Phirippidis . |
| 5,472,301 | 12/1995 | Wallen .................................... 410/151 |

FOREIGN PATENT DOCUMENTS

| | | | |
|---|---|---|---|
| 1937140 | 2/1971 | Germany .............................. 224/542 |
| 2191800 | 12/1987 | United Kingdom ................... 410/151 |

*Primary Examiner*—Linda J. Sholl
*Attorney, Agent, or Firm*—Boris Zaretsky

[57] ABSTRACT

A trunk organizer is disclosed having a holding bar assembly, a plurality of receptacles and a mechanism for attaching the receptacles to the holding bar assembly. The holding bar assembly preferably comprises three axially aligned bars which longitudinally and axially slide toward and away from each other. Two of the bars can be axially moved away from each other for adjusting the length of the holding bar assembly. A compression spring between two of the portions allows for one portion to be held in a biased position relative to the other.

15 Claims, 2 Drawing Sheets

AUTOMOBILE TRUNK ORGANIZER

FIELD OF THE INVENTION

The invention relates generally to organizers. More particularly, the invention relates to devices used in the trunk compartments of automobiles for use in organizing and preventing the loose movement of the contents of the trunk compartment.

BACKGROUND OF THE INVENTION

Most automobiles have a trunk compartment which is useful and frequently used for carrying an assortment of objects from one location to another. There are numerous occupations, e.g. sales, where it is convenient or necessary to carry an assortment of tools, samples, papers, and other items on a continuous basis. In addition, many people use their automobile trunk on a regular basis for carrying groceries, laundry, large purchases, and other items. In most cases, the automobile trunk compartment is substantially larger than the objects which are carried therein, and thus the objects are likely to move around loosely in the trunk compartment. This can damage the trunk compartment upholstery and, in addition, the objects themselves can be damaged by being dented, broken, or spilled. If the objects are boxes of organized files, such spillage can be highly inconvenient and time consuming to rectify.

A number of patents have issued which disclose a variety of trunk organizers. Some patents, for example, U.S. Pat. Nos. 4,754,883 to Grzywa and 4,832,242 to Leek, teach organizers which will hold specifically shaped and sized items. For instance, the organizer taught by Grzywa discloses a container that fits in an automobile trunk and includes compartments designed to hold oil, transmission fluid, a funnel, coolant, tools, rags and other specific automotive care items.

Another example of a trunk organizer is disclosed in U.S. Pat. No. 5,025,964 to Phirippidis, which teaches a modular assembly of boxes of various sizes that will retain objects of various shapes in a stationary position. This device will not, however, contain objects larger than the boxes, and the boxes of the device itself fill a large portion of the trunk. U.S. Pat. No. 4,838,745 to Haydock teaches a trunk organizer having a plurality of rectangular blocks which are constructed to stick to the trunk compartment floor for placement around items so that the items can be held in desired positions within the trunk compartment.

The devices taught in the above referenced patents are unsatisfactory for everyday use in that they do not provide sufficient flexibility for securing a variety of objects of varying sizes within a trunk compartment. The organizers taught by Grzywa and Leek impose very strict size and shape requirements on the objects to be retained. While the organizer taught by Phirippidis is more versatile, it also requires that the objects be fit inside redefined modular boxes. Haydock teaches an organizer that can retain various shapes and sizes of objects, but is inconvenient to use because its blocks must be specifically arranged to surround each object that is to be held in stationary position, and the blocks must first be assembled and then disassembled before and after each use.

Thus, what is needed, and seemingly unavailable in the art is a trunk organizer constructed and arranged for use in securing any number of objects, of all shapes and sizes, in a trunk from loose or random movement, but which can also be quickly and easily placed in an automobile trunk for usage, and just as easily removed.

SUMMARY OF THE INVENTION

Accordingly, it is an object of the present invention to provide a trunk organizer that will organize and stabilize the contents of an automobile trunk compartment that overcomes the design deficiencies of the prior art trunk organizers.

It is another object of the present invention to provide a trunk organizer that can be used in automobile trunk compartments of various sizes, and that can be easily transferred from one trunk to another.

It is an additional object of the present invention to provide a trunk organizer for retaining and organizing various shapes and sizes of objects.

It is yet another object of the present invention to provide a trunk organizer that can be easily installed, repositioned, and removed from an automobile trunk.

It is a further object of the present invention to provide a trunk organizer that will not damage the inside surfaces of an automobile trunk compartment.

To fulfill these and other objects, a trunk organizer is disclosed that comprises a holding bar assembly that extends across the trunk compartment and securely fastens to the opposing side walls of the trunk compartment. The holding bar assembly is adjustable in length to fit trunks of various widths. A biasing mechanism and bias locking mechanism are provided so that the bar assembly can be easily installed, repositioned, and removed from the trunk and can be reinstalled in the same trunk compartment without having to be readjusted. Various sized receptacles for holding objects can be used with the holding bar assembly. The receptacles are securely fastened to the holding bar assembly. Alternatively, objects can be directly fastened to the holding bar assembly.

The above described and other objects and aspects of the present invention will become more apparent by reference to the detailed description of the preferred embodiment and the attached figures, wherein like characters or reference numbers designate corresponding parts throughout the several views.

DETAILED DESCRIPTION

Figure 1:
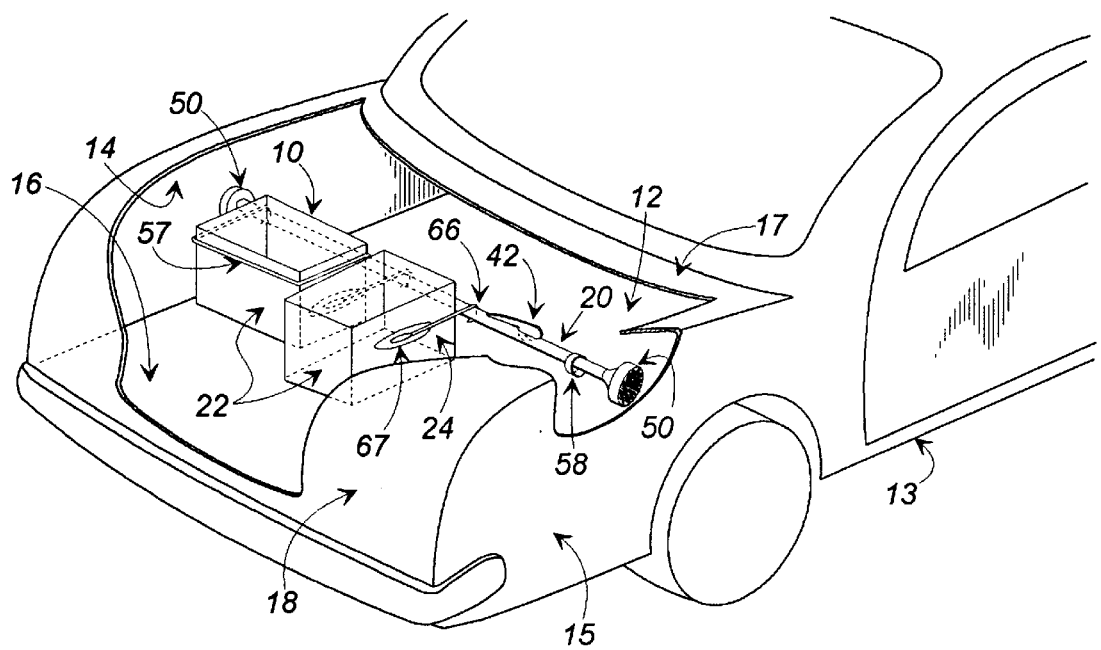
FIG. 1 is a perspective view of a preferred embodiment of the trunk organizer of the present invention positioned in an automobile trunk compartment.

Referring now to the drawings, FIG. 1 shows a preferred embodiment of the trunk organizer as numeral 10 installed in the trunk compartment 12 of an automobile 13. The trunk compartment 12 comprises an open space defined by two opposing side walls 14 and 15, a bottom floor 16, and front and rear walls 17 and 18. Side walls 14, 15 may be the metal skin of the automobile or, more typically, are separately installed walls made of metal and an insulating or soundproofing material, or the like. Typically, the side walls 14 and 15, floor 16, and front and rear walls 17 and 18 of the trunk compartment are upholstered.

The trunk organizer 10 comprises a holding bar assembly 20 that is constructed to have a plurality of receptacles 22 attached thereto by an attachment mechanism such as a cord 24 attached to a receptacle and having a hook on one end to grasp the bar 20 or a bungee cord 57 having hooks on both ends. The contents of the trunk will then be securely retained in the receptacles 22. Alternatively, other objects (not illustrated) such as boxes or grocery bags, can be directly attached to the holding bar assembly 20 by attachment mechanism 24 or 57.

Figure 2:
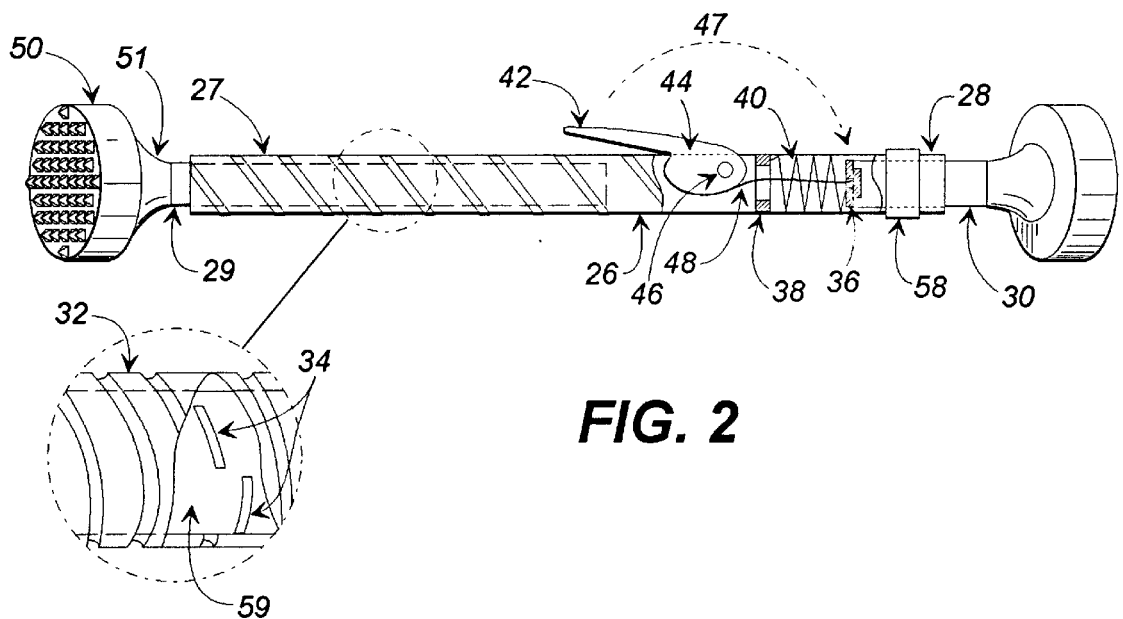
FIG. 2 is a partially cross sectioned, partially exploded, side elevational view of the holding bar assembly of the trunk organizer of FIG. 1.

As shown in more detail in FIG. 2, a preferred embodiment of the holding bar assembly 20 comprises three elongated and substantially cylindrical members or tubes. The central or stationary member 26 is preferably an elongated cylindrical tube made of metal, plastic, or any other durable and generally rigid material, having a first end 27 (to the left in FIG. 2) and a spaced second end 28. Alternatively, the central member 26 may be a substantially solid bar having cylindrical hollow end portions 27, 28 for receiving the ends of second member 29 and third member 30, respectively. First end 27 has a plurality of inner notch threads defined therein (not shown).

A second member of the holding bar assembly 20 is the adjustment member 29, which contains a region at its end 59 with a plurality of partial (as shown in FIG. 2) or full outer notch threads 34 which will engage threadedly with the inner notch threads of the first end of the stationary member 26. Thus, members 26 and 29 are screwed or unscrewed to shorten or lengthen the holding bar assembly, respectively. Alternatively, other adjustment mechanisms can be employed in the invention. Adjustment bar 29 can be metal, plastic or any other durable and generally rigid material, and can be a solid bar or a hollow tube.

The third member of the holding bar assembly is the biasing member 30 which is slidably received within the second end 28 of the stationary bar 26. The biasing member 30 is connected to a biasing mechanism 37 positioned in the stationary bar 26, so that when the biasing mechanism is actuated the biasing member 30 will be slidably (and axially) moved away from the stationary bar 26 and held by the biasing mechanism 37 away from stationary bar 26. Biasing member 30 allows for holding bar assembly 20 to be installed with its ends 27 and 28 tightly engaged against the side walls 14 and 15 of the trunk without having to threadedly adjust the length of the bar assembly each time it is installed in the trunk. Biasing member 30 can be a solid bar or a hollow tube with 5 an end cap 36 affixed to the end nearest the stationary bar 26.

Figure 3:
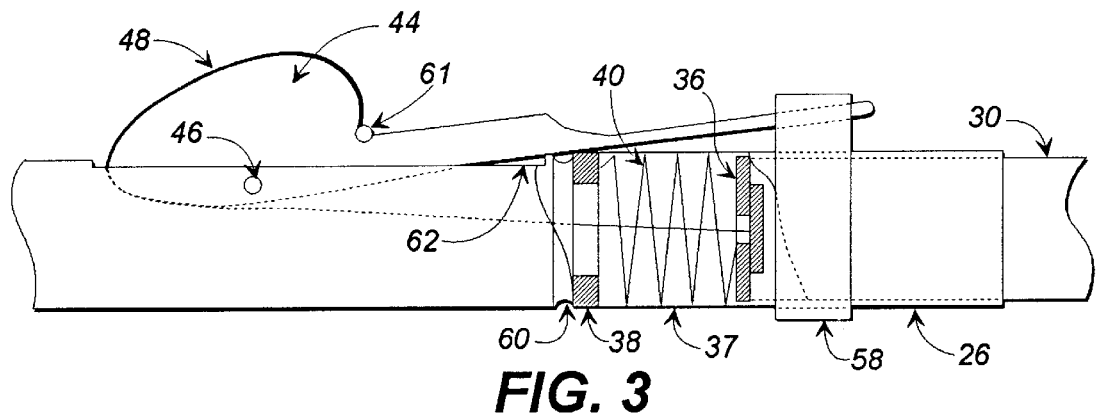
FIG. 3 is an enlarged view of the biasing and locking mechanisms of the trunk organizer of the present invention.
Figure 4:
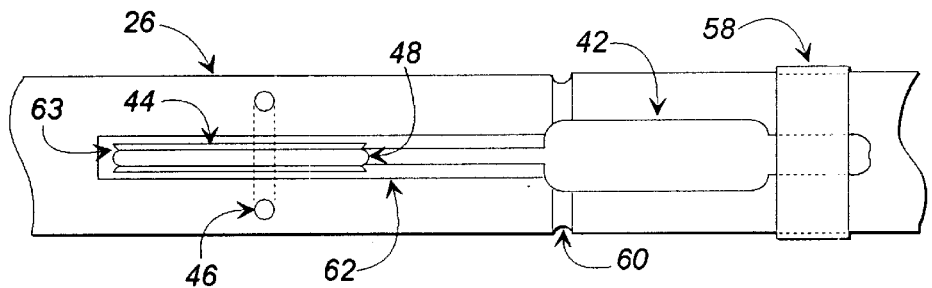
FIG. 4 is a top view of the biasing and locking mechanisms of the trunk organizer of the present invention.

Biasing mechanism 37, shown more clearly in FIGS. 3 and 4, is installed within the stationary bar 26 inside the opening 62 of the bar 26. An annular plate 38 is rigidly fixed within the bar 26 and rests on the inner circular notch 60 so that a compression spring 40 is retained within bar 26 between end cap 36 of the biasing bar 30 and plate 38. Spring 40 will be compressed by the movement of biasing bar 30 toward solid plate 38 as biasing mechanism 37 is actuated through a handle 42. Handle 42 has a cam shaped bearing 44 formed as a part thereof. Bearing 44 is seated within the stationary bar 26 and is positioned for rotatable movement. Cam shaped bearing 44 is secured within the stationary bar 26 by a fastener 46 which is, for example, a rivet passing through the stationary bar 26 and an aperture (not illustrated) in the cam shaped bearing 44. The cam shaped bearing 44 has a beveled edge 63, shown in FIG. 4, which receives the tension wire 48 and prevents the tension wire 48 from slipping. As the cam shaped bearing 44 is rotated by the movement of the handle 42 in the direction shown by arrow 47, the tension wire 48, having one end attached to the cam shaped bearing 44 by, for example, a rivet 61 and the other end attached to the end cap 36, pulls the end cap 36 towards the solid plate 38. The compression spring 40 is thus compressed, the biased portion 30 is pulled towards the stationary portion 26 and the length of the holding bar assembly is shortened (as shown in FIG. 3). When the handle 42 is released and turns in the direction opposite that shown by arrow 47, the end cap 36 is pushed away from the solid plate 38, the spring is decompressed, and the length of the holding bar assembly is expanded (as shown in FIG. 2).

The cammed shape of the bearing 44 tends to hold handle 42 in either its closed position next to the holding bar assembly, shown in FIG. 2, or in its open position, shown in FIGS. 3 and 4, furthest away from the holding bar assembly when biasing member 30 is compressed. To safely lock the handle open and hold the spring in its fully compressed position, handle 42 is held in place by the rubber band 58.

Figure 5:
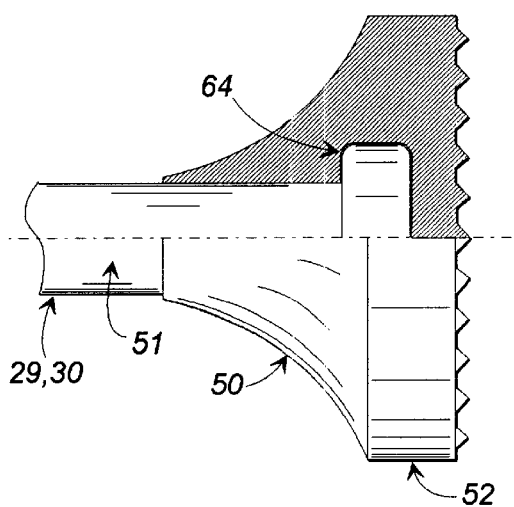
FIG. 5 is a partially cut away, elevational view of one end of the holding bar assembly of the trunk organizer of FIG. 1 showing the protection boot.
Figure 6:
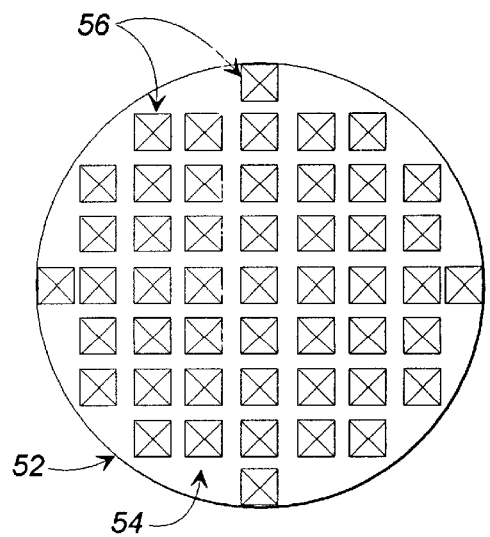
FIG. 6 is an elevational end view of a protection boot of the present invention.

The holding bar assembly 20 also includes a pair of protection boots 50 shown in FIGS. 5 and 6 attached to both ends of the holding bar assembly that engage the side walls 14, 15 of the trunk compartment. Boots 50 may either be formed integrally with the holding bar assembly, or may be attached to the free ends of adjustment member 29 and biasing member 30. The protection boot may, for example, have a generally cylindrical seat 51 defined therein for accepting and retaining the ends of holding bar assembly 20. A circular plate 64 caps the end of each member 29 and 30 and reduces the pressure exerted on the soft material of the boots by the ends of the members 29, 30 and protects the boots, particularly when the ends of the holding bar assembly are held tightly against the sides of the trunk. Each of boots 50 has a flanged portion 52, and an outer surface 54 which engages the side walls 14 and 15 of the trunk compartment. This outer surface 54 contains a plurality of generally protruding teeth 56 constructed to aid in the engagement of the protection boot with the side walls of the trunk. Protection boots 50 are preferably comprised of a hard polymeric substance such as rubber, or its equivalent.

To install the holding bar assembly 20 in an automobile trunk 12, the handle 42 is rotated in the direction indicated by the arrow 47 (see FIG. 2) so that the compression spring 40 is compressed and biasing bar 30 is urged toward the stationary bar 26. Then the handle 42 is secured to the bar 26 by sliding the rubber band 58 over the end of the handle This holds the spring in its compressed position. The holding bar assembly is placed in the trunk compartment with its two ends placed toward opposing side walls 14 and 15 of the trunk compartment. The adjustment bar 29 is twisted so that it is extended out of or moved into stationary member 26 to make the holding bar assembly longer or shorter, respectively, and thus position the assembly with protection boots 50 loosely against the side walls 14 and 15 of the trunk compartment 12. When the holding bar assembly 20 is adjusted so that the protection boots rest loosely against the side walls of the trunk compartment, the rubber band 58 is removed and the spring 40 is decompressed. The biasing bar 30 is urged away from the stationary bar 28 by decompression of the spring 40, and the protection boots are urged against and held biased against the side walls of the trunk. Thus, the holding bar assembly is held firmly in place.

To remove the bar assembly, the handle 42 is rotated in the direction of the arrow 47 which acts to compress spring 40 and thus shorten the length of the holding bar assembly 20. The handle can be held by the locking rubber band 58. The assembly is then removed from the trunk compartment. To install and remove the holding bar assembly 20 from the same trunk compartment, or a trunk compartment of the same size, the assembly does not have to be threadedly adjusted in length but rather the handle 42 can simply be rotated to retract and extend the length of the assembly. However, if necessary, the adjustment member 29 can be threaded into and out of the stationary member 26 to shorten or lengthen the holding bar assembly for trunks of differing sizes.

Holding bar assembly 20 can be used by itself as a trunk organizer by attaching items to it directly. Attachment mechanism 24 or 57 can be used for this purpose. Attachment mechanism 24 has one end 66 attached to the holding bar assembly and a second end 67 attached to the object, for example, receptacle 22 to be secured. Alternatively, a rubber band type device commonly referred to as a bungee cord 57 can be used as an attachment mechanism to secure items to the holding bar assembly.

In a preferred embodiment, the trunk organizer 10 further comprises receptacles 22 which are designed to be attached to the holding bar assembly 20 by attachment mechanism 24 or 57. Objects to be secured in the trunk can be placed within the receptacles 22, the receptacles then being attached to the holding bar assembly. For example, a receptacle 22 can comprise a file box sized to hold legal or letter sized manila folders. The folders will be held in an organized fashion within the receptacle 22, the receptacle being held in place against the holding bar assembly 20 by attachment mechanism 24 or 57 to prevent its loose or unrestricted movement within trunk 12 as automobile 13 is moving.

While a preferred embodiment of the invention has been disclosed herein, modifications thereof will be apparent to those of skill in the art that remain within the scope and spirit of the invention, as disclosed in the following claims.

What is claimed is:

1. A trunk organizer for use in an automobile trunk compartment having opposing side walls to restrain movement of the contents of the trunk compartment, comprising:
   a holding bar assembly constructed and arranged to extend across the trunk compartment and having two spaced ends that fixedly engage opposing side walls of the trunk compartment, said holding bar assembly having at least a first portion and a second portion adapted to axially move away from each other toward the opposing side walls of the trunk;
   biasing means, formed as a part of said bar assembly, for biasing said first and second portions axially away from each other so that said two ends of said holding bar assembly fixedly engage the two side walls of the trunk compartment, comprising a compression spring positioned within said assembly and between said first portion and said second portion;
   means for holding said first and second portions in a biased position and handle means for releasing said first and second portions from said biased position means comprising a handle attached to a cam shaped bearing positioned in said first portion and having a tension wire fastened to said second portion, so that as said cam bearing is rotated by said handle it moves said second portion toward said first portion and compresses said spring.

2. The trunk organizer of claim 1, wherein said holding bar assembly further comprises adjustment means for varying the length of said bar assembly.

3. The trunk organizer of claim 2, wherein said holding bar assembly comprises a third portion longitudinally and axially aligned with said first and second portions, and wherein said adjustment means acts to displace the third portion longitudinally and axially away from one of said first and second portions.

4. The trunk organizer of claim 3, wherein said adjustment means comprises a plurality of threads defined on said third portion and a plurality of matching threads defined within at least one of said first and second portions.

5. The trunk organizer of claim 1, further comprising protection boots attached to said spaced ends of said holding bar assembly.

6. The trunk organizer of claim 5, wherein said protection boots comprise flanged surfaces having a plurality of teeth formed thereon, said teeth being sized and shaped to engage the side walls of the trunk compartment.

7. The trunk organizer of claim 1, further comprising means for securing the trunk contents to said holding bar assembly.

8. The trunk organizer of claim 1, further comprising means for locking said handle so as to hold said compression spring in said compressed position.

9. The trunk organizer of claim 1, further comprising a plurality of receptacles and means for attaching said receptacles to said holding bar assembly.

10. A trunk organizer for use in securing the contents of an automobile trunk compartment having opposing side walls, comprising:
    a holding bar assembly constructed and arranged to extend across the trunk compartment and having two spaced ends that fixedly engage opposing side walls of the trunk compartment, said holding bar assembly having a first portion, a second portion, and a third portion axially aligned with each other and sized and shaped to axially move away from each other toward the opposing side walls of the trunk;
    adjustment means formed as a part of said assembly and positioned between said third portion and said second portion for varying the length of said holding bar assembly;
    biasing means formed as a part of said assembly and positioned between said first portion and said second portion for biasing said two portions axially away from each other, said biasing means comprising a compression spring and being actuated by a handle attached to a cam shaped bearing seated in said first portion and having a connection wire extending therefrom and fastened to said second portion, so that as said handle is rotated it rotates said bearing and moves said second portion toward or away from said first portion and compresses or decompresses said spring; and
    means for holding said handle in position so that said compression spring is held in a compressed position.

11. The trunk organizer of claim 10, further comprising means for securing the trunk contents to said holding bar assembly.

12. The trunk organizer of claim 10, wherein said adjustment means comprises reciprocating threads on said third portion and said second portion.

13. The trunk organizer of claim 10, further comprising protection boots attached to the spaced ends of said holding bar assembly.

14. The trunk organizer of claim 13, wherein said protection boots comprise flanged surfaces having a plurality of teeth formed thereon.

15. The trunk organizer of claim 11, wherein said securing means comprises a plurality of receptacles and means for attaching said receptacles to said holding bar assembly.

* * * * *